(12) United States Patent
Jabara et al.

(10) Patent No.: US 9,064,374 B2
(45) Date of Patent: *Jun. 23, 2015

(54) SYSTEM AND METHOD FOR GAMING IN A DYNAMIC NETWORK USING WIRELESS COMMUNICATION DEVICES

(75) Inventors: Gary B. Jabara, Irvine, CA (US);
Christos Karmis, Irvine, CA (US);
David Brett Simon, Agoura Hills, CA (US); Lloyd Frederick Linder, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 555 days.

This patent is subject to a terminal disclaimer.

(21) Appl. No.: 13/398,727

(22) Filed: Feb. 16, 2012

(65) Prior Publication Data
US 2012/0149463 A1 Jun. 14, 2012

Related U.S. Application Data

(63) Continuation-in-part of application No. 13/363,943, filed on Feb. 1, 2012, which is a continuation-in-part of application No. 13/093,998, filed on Apr. 26, 2011, which is a continuation-in-part of application No. 12/958,296, filed on Dec. 1, 2010, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
| | |
|---|---|
| G07F 17/32 | (2006.01) |
| H04W 4/08 | (2009.01) |
| H04W 4/02 | (2009.01) |
| H04W 76/02 | (2009.01) |
| H04W 4/10 | (2009.01) |
| H04L 29/08 | (2006.01) |

(52) U.S. Cl.
CPC ........ *G07F 17/3225* (2013.01); *G07F 17/3218* (2013.01); *G07F 17/3223* (2013.01); *H04W 4/08* (2013.01); *H04W 4/10* (2013.01); *H04L 67/1095* (2013.01); *H04W 4/02* (2013.01); *H04W 76/02* (2013.01)

(58) Field of Classification Search
CPC ............ A63F 13/12; A63F 2300/5546; A63F 2300/537; A63F 2300/8023; A63F 2300/405; A63F 2300/552; A63F 2300/5586; A63F 2300/572; A63F 2300/8064; A63F 2300/8088; H04W 12/06; H04W 8/18; H04W 4/02; H04N 7/17318; H04N 21/41407; H04L 29/08108
USPC ......... 455/3.06, 414.1, 414.2, 41.2, 421, 507, 455/517; 463/42, 31, 25
See application file for complete search history.

(56) References Cited

U.S. PATENT DOCUMENTS

| | | |
|---|---|---|
| 5,605,506 A | 2/1997 | Hoorn et al. |
| 7,938,727 B1 * | 5/2011 | Konkle ........................... 463/42 |

(Continued)

*Primary Examiner* — Minh D Dao
(74) *Attorney, Agent, or Firm* — Michael J. Donohue; Davis Wright Tremaine LLP

(57) ABSTRACT

A short-range wireless network is established by direct communication between wireless devices and wireless access points to permit gambling within a casino. The short communication range of the access points assures that the wireless device is in the casino. A gaming communication link is used to exchange game play data (e.g., betting, card dealing, etc.) between a gaming controller and one or more wireless devices. Game play may be conducted between a player and the house or between a plurality of payers. In one embodiment, all communication is routed between players using the gaming controller so that the house controls the transmission of all game play data.

21 Claims, 9 Drawing Sheets

(56) References Cited

U.S. PATENT DOCUMENTS

| | | | |
|---|---|---|---|
| 8,070,600 B2 * | 12/2011 | Campo et al. | 463/31 |
| 8,371,932 B2 * | 2/2013 | Gagner et al. | 463/25 |
| 8,376,860 B1 * | 2/2013 | Boutin | 463/42 |
| 2002/0002075 A1 | 1/2002 | Rowe | |
| 2006/0035707 A1 | 2/2006 | Nguyen et al. | |
| 2009/0186700 A1 * | 7/2009 | Konkle | 463/42 |
| 2010/0016056 A1 * | 1/2010 | Thomas et al. | 463/20 |
| 2014/0204763 A1 * | 7/2014 | Devnath et al. | 370/238 |

* cited by examiner

SYSTEM AND METHOD FOR GAMING IN A DYNAMIC NETWORK USING WIRELESS COMMUNICATION DEVICES

RELATED APPLICATIONS

This application is a continuation-in-part of U.S. application Ser. No. 13/363,943 filed Feb. 1, 2012 which is a continuation-in-part of U.S. application Ser. No. 13/093,998 filed on Apr. 26, 2011, which is a continuation-in-part of U.S. application Ser. No. 12/958,296 filed on Dec. 1, 2010, which is a continuation-in-part of U.S. application Ser. No. 12/616,958 filed on Nov. 12, 2009, which is a continuation-in-part of U.S. application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

1. Field of the Invention

The present invention is directed generally to wireless communication devices and, more particularly, to a system and method of network management to permit gaming using short-range communication networks.

2. Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The system described herein extends the normal operational features of conventional wireless communication devices. As described above, the conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
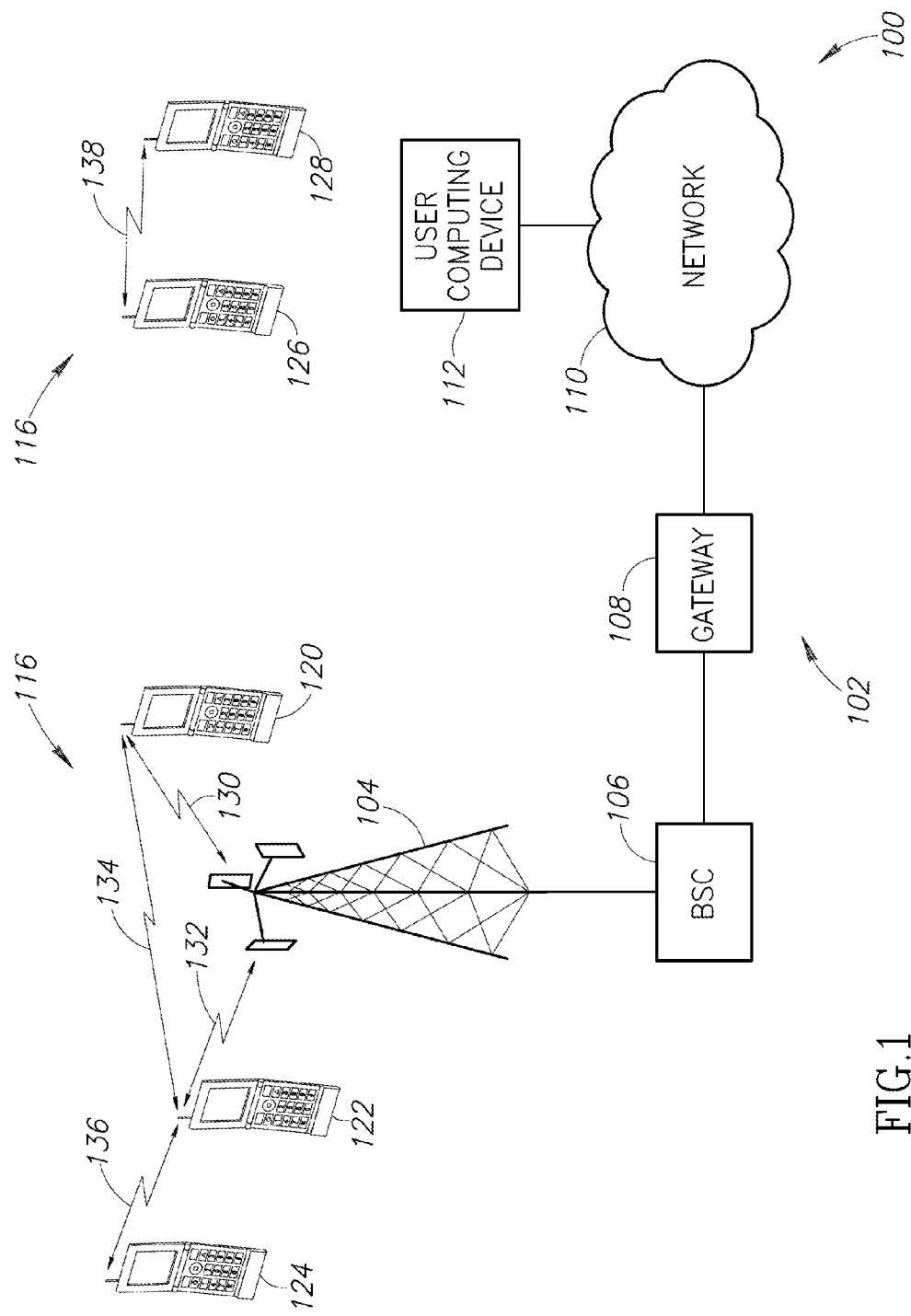
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional wireless communication network 102 includes a base station 104, which forms part of a radio access network (RAN) for a wireless service provider. The wireless communication network 102 may sometimes be referred to as a public land mobile network (PLMN). Those skilled in the art will appreciate that the typical wireless communication network 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104 or other base stations (not shown) in the wireless communication network 102. The wireless communication devices 120-128 may be referred to generically as user equipment (UE). The term UE is intended to include any wireless communication device capable of processing audio, video, and text messaging. This includes smart phones, laptops, PDAs, computer tablets (e.g., an iPad™), and the like.

Those skilled in the art will appreciate that the wireless communication network 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104 or other base station (not shown). Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices. This short-range communication is accomplished without reliance on the wireless communication network 102. Indeed, as will be described in greater detail below, the short-range transceivers in the mobile communication devices 120-128 permit the dynamic formation of a short-range communication network 116 that does not rely on the wireless communication network 102 provided by any wireless service provider. Thus, wireless communication devices can rely on the conventional wireless communication network 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the wireless communication network 102. However, the wireless communication device 124 can communicate directly with the wireless communication device 122 via a short-range wireless communication link 136. Also illustrated in FIG. 1 are the wireless communication devices 126-128. Although neither of these devices is in communication with the wireless communication network 102, the two devices are in direct communication with each other via a short-range wireless communication link 138. Thus, jump-enabled wireless communication devices must be in proximity with each other, but need not be in communication with the wireless communication network 102 or even in an area of wireless coverage provided by the wireless communication network.

The dynamic formation of one or more short-range networks 116 allows communication between the wireless communications devices 120-128 independent of the wireless communication network 102 even if the wireless communication network 102 is present and operational. The short-range communication network 116 advantageously allows communication in settings where the wireless communication network 102 is not present or in a situation where the wireless communication network is unavailable. For example, the wireless communication network 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled wireless communication devices move throughout a geographic location.

Figure 2:
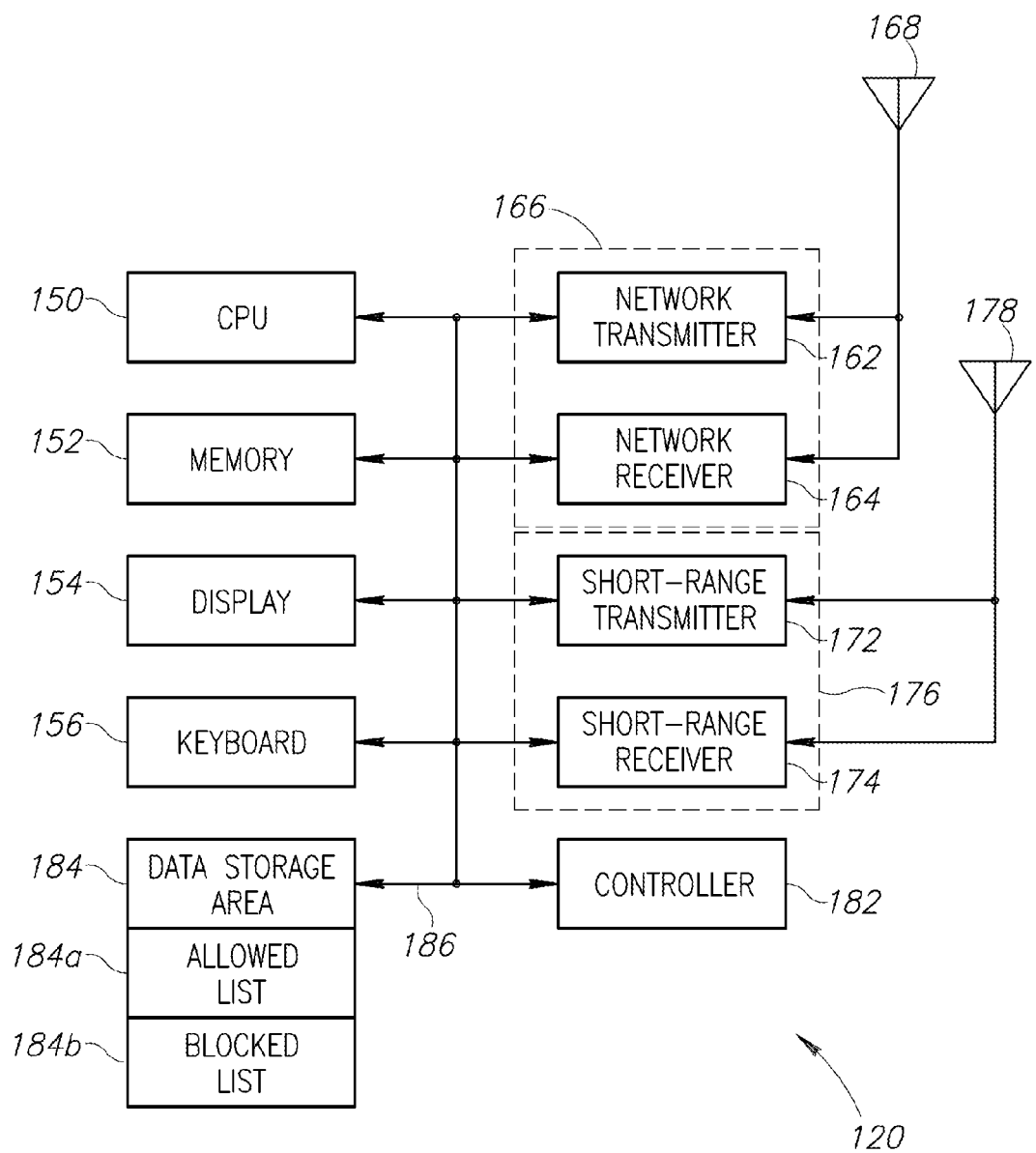
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the wireless communication network 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between wireless communication devices that become part of the short-range communication network 116. The data storage 184 contains user profile data and messaging data that will be exchanged between wireless communication devices in the short-range communication network 116. The data storage area 184 may be implemented as any convenient data structure. As will be described in greater detail below, the data storage area 184 contains data (e.g., messages, personal profile information of contacts, a geographical location tag for each contact, and the like) that will be exchanged between wireless communication devices. The data may be stored as a simple list, part of a database, or any other convenient data storage structure. The user profile can include a broad array of information such as user name, nickname, age, sex, education and work background, hobbies, food preferences (love sushi, Hunan, and Mediterranean food, etc.), and the like. In one embodiment, described in U.S. application Ser. No. 12/397,225, filed on Mar. 3, 2009, now U.S. Pat. No. 7,970,351, two wireless devices may exchange portions of user profile data to determine whether there is a suitable match between the users. If the phones determine that there is a suitable match based on the user profiles, an alert signal may be generated to indicate to the individual users that there is a person nearby that they should meet. In another embodiment, user profile data may be used in a business venue to determine appropriate marketing and advertisement data based on the user profile.

The data storage area 184 also stores a list of other nearby wireless communication devices that form part of the short-range wireless communication network 116. In addition, the data storage area 184 may include an Allowed List 184a and a Blocked List 184b in connection with device authentication. As will be described in greater detail below, the Allowed List 184a contains identities of nearby wireless communication devices that have been verified while the Blocked List 184b includes a list of nearby wireless communication devices that have been determined not to be authentic or which the user, a their own discretion, has decided to block.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134).

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-128 all include WiFi capability, short-range communication networks 116 may be formed even though the wireless communication devices may be designed to operate with incompatible wireless communication networks 102. For example, the wireless communication device 122 may be configured for operation with a GSM implementation of the wireless communication network 102. The wireless communication device 124 may be configured for operation with a CDMA implementation of a wireless communication network 102. Even though the wireless communication devices 122-124 are incompatible with respect to the respective wireless communication networks 102, the wireless communication devices 122-124 may still communicate directly with each other via the short-range communication network 116. Thus, the wireless communication devices 120-128 may operate compatibly to form the short-range communication networks 116 even though the network transceivers 166 (see FIG. 2) may operate with different incompatible wireless communication networks 102.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,988 filed on Apr. 26, 2011, the entire disclosures and content of which are hereby incorporated by reference in their entirety.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the wireless communication devices may be pre-programmed to utilize a common SSID, IPrange, and port to spontaneously form a short-range communication network 116 even in the absence of any hot spot.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In addition, since there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
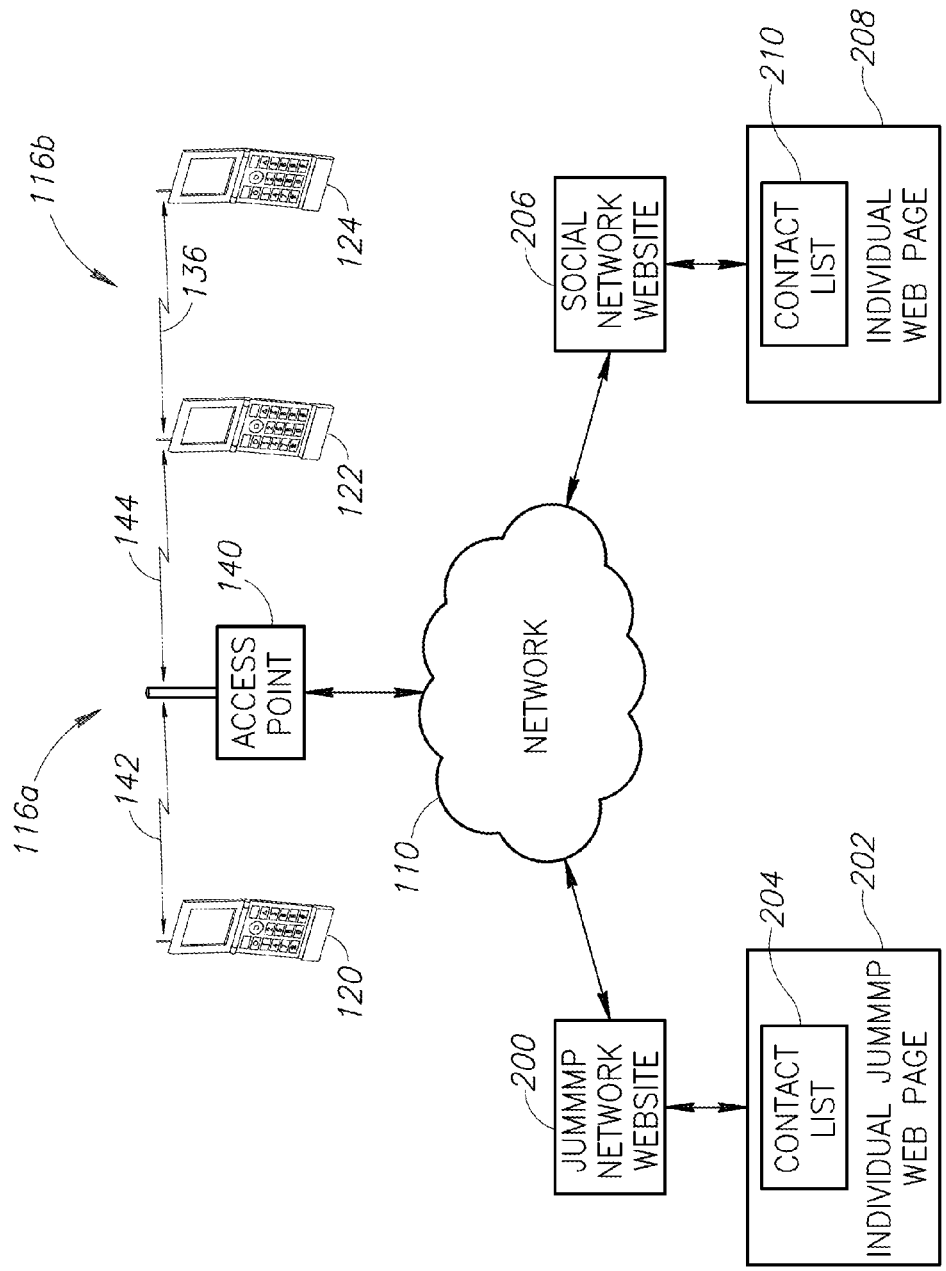
FIG. 3 illustrates an embodiment of the system of FIG. 1 using an access point as part of a network.

In yet another alternative embodiment, illustrated in FIG. 3, the jump-enabled wireless communication devices (e.g., the wireless communication devices 120-122) may communicate with an access point 140, such as a WiFi base station, WAP, wireless router, or the like. As will be described in greater detail below, a wireless communication device (e.g., one of the wireless communication devices 120-124) may function as the access point 140 to permit others of the wireless communication devices in the short range communication network 116 to access the network 110 via the wireless communication device serving as the access point. FIG. 3 illustrates a wireless communication link 142 established between the access point 140 and the wireless communication device 120. Similarly, the wireless communication device 122 establishes a wireless communication link 144 with the access point 140. Thus, a short-range communication network 116a is formed in conjunction with the access point 140. To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the wireless communication devices 120-124, there may be one or more short-range communication networks 116 formed. In the example of FIG. 3, the wireless communication devices 120-122 are both within range of the access point 140. Therefore, the first short-range communication network 116a can be formed with the wireless communication devices 120-122 and the access point 140.

The wireless communication device 124 is within range of the wireless communication device 122, but is not within range of the access point 140. In one embodiment, the wireless communication device 124 may be become part of the short-range communication network 116a via the wireless communication device 122. In this embodiment, the wireless communication device 122 functions as a "repeater" or relay to relay information between the wireless communication device 124 and other parts of the short-range communication network 116a. In another embodiment, a second short-range communication network 116b is formed with the wireless communication devices 122-124. In this exemplary embodiment, the wireless communication device 122 is part of both short-range communication networks 116a-116b. The wireless communication device 122 may simultaneously be a member of both short-range communication networks 116a-116b or may be logically connected to both short-range communication networks 116a-116b by alternately switching between the short-range communication networks 116a-116b.

The access point 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 effectively functions as a social network website. Similarly, the JUMMMP website technology can be incorporated into existing social network websites. Thus, the two separate websites illustrated in FIG. 3 can effectively be combined into a single website.

As discussed in detail in co-pending U.S. application Ser. No. 12/616,958, filed on Nov. 12, 2009 and assigned to the assignee of the present application, the user of a jump-enabled wireless communication device (e.g., the wireless device 120) may use the web-browsing capability of the wireless communication device to access the individual jump web page 202 for the individual with whom contact has just been made to learn more about that individual. Alternatively, the user of a jump-enabled wireless communication device (e.g., the wireless device 120) may use the web-browsing capability of the wireless communication device to access the user's own individual jump web page 202 to store information for the individual with whom contact has just been made. A contact list 204, which is typically a portion of the individual jump web page 202 is configured to store contact information. Similarly, the individual jump web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

The wireless communication devices 120-128 (see FIG. 1) generally have sufficient memory capacity to temporarily store contact information. In an exemplary embodiment, the wireless communication device (e.g., the wireless communication device 120) can temporarily store new contact information until access to the network 110 becomes available at a later time. In addition, the wireless communication device 120 can store designated contact information (e.g., "Favorites") on a more permanent basis. Long-term storage of contact information requires access to the network 110. In the embodiment of FIG. 1, access to the network 110 may be provided via the base station 104 in a conventional manner. The wireless communication device 122 may access the network 110 by communicating directly with the base station 104. In the embodiment of FIG. 3, access to the network 110 may be provided via the access point 140, as described above. For example, the wireless communication device 122 in FIG. 1 may access the network 110 by communicating directly with the access point 140 via the short-range communication link 144. Alternatively, the wireless communication device 122 can access the network 110 and the JUMMMP network website 200 via the wireless communication link 132 to the base station 104. Network access via the gateway 108 is well known in the art and need not be described in greater detail herein.

In an alternative embodiment, access to the network 110 may be provided via another jump-enabled wireless communication device. For example, in FIG. 1, the wireless communication device 122 can communicate with the base station 104 via the wireless communication link 132 while the wireless communication device 124 cannot communicate directly with the base station. However, the wireless communication device 124 is in proximity with the wireless communication device 122 and can communicate with the wireless communication device 122 via the wireless communication link 136 as part of the short-range communication network 116. In this embodiment, the wireless communication device 124 can use the wireless communication device 122 as a repeater or relay to allow the wireless communication device 122 to access the network 110 via the wireless communication device 122 and the base station 104.

Similarly, in the embodiment of FIG. 3, the wireless communication devices 120-122 can communicate directly with the access point 140 via the wireless communication links 142-144, respectively. The wireless communication devices 120-122 can also communicate with each other via the access point 140 thus forming the short-range communication network 116a. As seen in FIG. 3, the wireless communication device 124 cannot communicate directly with the access point 140. However, the wireless communication device 124 is in proximity with the wireless communication device 122 and can communicate with the network 110 via the wireless communication device 122 and the access point 140.

Figure 4:
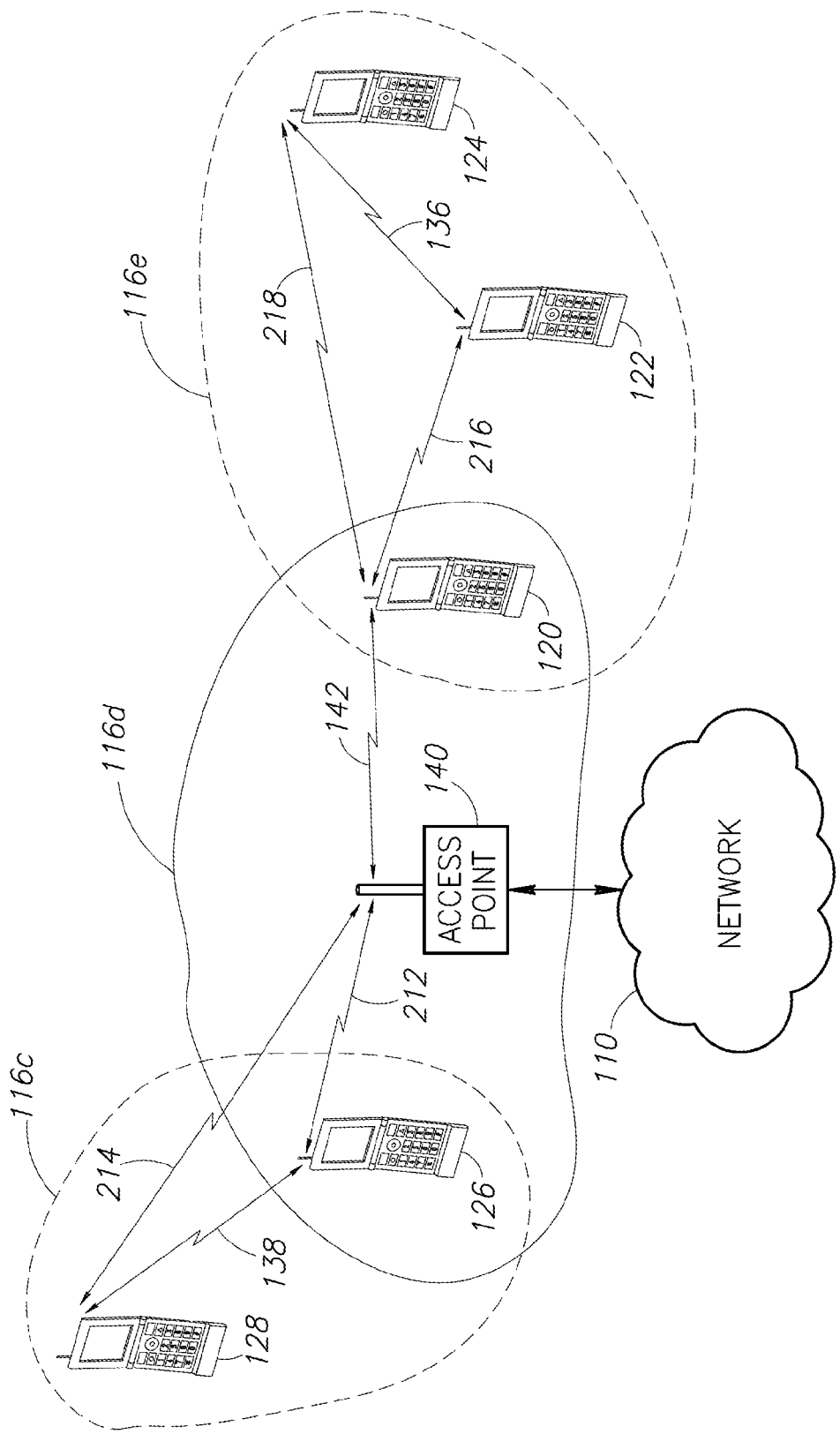
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the wireless communication devices 120-124 and a second short-range communication network 116 formed between the wireless communication devices 126-128. FIG. 4 illustrates the dynamic nature of the wireless communication networks 116. For example, if the wireless communication device 128 is initially within range of the wireless communication device 126, but out of range of the access point 140, the wireless communication devices 126-128 may form a short-range communication network 116c using the short-range communication link 138. If the wireless communication device 126 comes within range of the access point 140, a wireless communication link 212 is formed. In that event, the wireless communication device 126 may become part of a short-range communication network 116d formed between the access point 140 and the wireless communication devices 120 and 126. At this particular moment in time, the mobile communication device 126 may be part of both the short-range communication network 116c and the short-range communication network 116d. As discussed above, the wireless communication device 126 may actually be part of both the short-range communication networks 116c-116d or may logically be connected to both the short-range wireless communication networks by switching back and forth between the short-range communication networks 116c-116d. The logical switching between the short-range communication networks 116c-116d is transparent to the user. Other examples of the short-range communication network 116 are described below in which no access point 140 is present.

Alternatively, the wireless communication device 128 may become part of the short-range communication network 116d using the wireless communication device 126 as a relay to the access point 140. If, at a later time, the wireless communication device 128 comes within range of the access point 140, a wireless communication link 214 is formed there between. At that point in time, the short-range communication network 116c effectively ceases to exist since the wireless communication devices 126-128 are now part of the short-range communication network 116d.

The wireless communication device 120 may be part of the short-range communication network 116d by virtue of the short-range communication link 142 coupling the wireless communication device 120 to the access point 140. If the wireless communication device 120 comes within range of the wireless communication devices 122-124, wireless communication links 216-218 will be formed to couple the wireless communication devices 120-124 and thereby dynamically form a short-range communication network 116e. At this point in time, the wireless communication device 120 may simultaneously be part of the short-range communication network 116d and the short-range communication network 116e. Alternatively, the wireless communication devices 122-124 may become part of the short-range communication network 116d via the wireless communication device 120.

If the wireless communication device 120 subsequently moves out of range of the access point 140, the wireless communication link 142 is broken. Therefore, there will no longer be an overlap between the short-range communication networks 116d-116e. The wireless communication device 120 would remain part of the short-range communication network 116e so long as it remains within range of the wireless communication device 122, the wireless communication device 124, or both. Thus, those skilled in the art will appreciate that short-range communication networks are dynamically formed, modified, and dissolved as the wireless communication devices move in and out of range with each other and central points, such as the access point 140. Furthermore, if the wireless communication device 120 comes back into range of the access point 140, the wireless communication link 142 can be reestablished. When this happens, all prior communications from the short-range communication network 116e will be transferred to the short-range communication networks 116d and 116c (and vice-versa) through the re-echoing function described above. That is, the various wireless communication devices will resynchronize the data in the data storage area 184 (see FIG. 2). Those skilled in the art will also appreciate that the short-range communication networks 116 may be formed, modified, and dissolved without the presence of the access point 140.

FIG. 4 illustrates the wireless communication device 120 as a key component in the short-range communication network 116e because it connects the wireless communication devices 122-124 to the access point 140. If the wireless communication device 120 suddenly moved out of range of the access point and/or the wireless communication devices 122-124 that connection may be broken. Similarly, if the user of the wireless communication device 120 suddenly turned off the device, the link between the short-range communication network 116e and the access point 140 would disappear. The wireless communication devices 122-124 still communicate with each other via the wireless communication link 136 and will still search for other wireless communication devices with which to connect. In addition, either of the wireless communication devices 122-124 will attempt to find the access point 140 or a hot spot from which either of the wireless communication devices may access the network 110.

FIG. 4 illustrates a sparse network with only five wireless communication devices. However, those skilled in the art can appreciate that there may be a very large number of wireless communication devices in proximity with each other. For example, if FIG. 4 is illustrative of a large shopping mall, there may be hundreds of wireless communication devices within the mall. Thus, the short-range communication networks 116 may be large and extensive. There may be a large number of wireless communication devices that are simultaneously present in two or more short-range communication networks 116. In addition, many wireless communication devices would provide overlapping coverage with multiple short-range communication networks 116. In this scenario, the entire mall and surrounding parking area could be effectively covered by a mesh network comprising dozens or hundreds of short-range communication networks 116. Thus, in the situation illustrated in FIG. 4 where the wireless communication device 120 is turned off or moved out of range of other wireless communication devices is less likely to cause the total isolation of the short-range communication network 116e. If the wireless communication device 120 were suddenly removed, either by powering down or by the departure from the area, many other wireless communication devices (not shown) in the same proximity would be able to replace the connectivity between the short-range communication network 116e and the access point 140.

Whenever a wireless communication device (e.g., the wireless communication device 124) comes within range of other wireless communication devices, a short-range wireless communication network (e.g., the short-range wireless communication network 116e), the wireless communication devices exchange message data with each other to thereby synchronize message data in the data storage area 184 (see FIG. 2). At the end of the synchronization process, the data storage area 184 of each wireless communication device will contain the same message data, although messages may not be in the same sequence. In the example described above, when the wireless communication device 124 comes within range of the wireless communication device 120 and/or the wireless communication device 122, the wireless communication links 136 and 218 are formed. Because the wireless communication device 124 has just joined the short-range communication network 116e, the data storage area 184 of the wireless communication device 124 will not be synchronized with the data storage area of other wireless communication devices in the short-range communication network 116e. During the synchronization process, the wireless communication device 124 transmits message data in its data storage area 184. The wireless communication devices 120 and 122 receive the message data. The controller 182 (see FIG. 2) in each wireless communication device receives the message data and merges the messages with the message data already stored within the data storage area 184 of the wireless communication devices 120 and 122, respectively. The controller 182 in each of the wireless communication devices may also eliminate duplicate messages. In this manner, each wireless communication device manages the message data within its data storage area 184.

As part of the synchronization process, the wireless communication devices 120 and 122 may also transmit the message data within their respective data storage areas 184. The wireless communication device 124 receives the messages from the wireless communication devices 120 and 122 and merges the newly received messages in the data storage area 184 of the wireless communication device 124. As described above, the controller 182 (see FIG. 2) of the wireless communication device 124 may eliminate duplicate messages within its data storage area 184. Following this synchronization process, all wireless communication devices in the short-range communication network 116e will have identical messages.

In an exemplary embodiment, the messages may be categorized as Public Messages, Group Messages, Direct Messages, and Status Messages. Public Messages may be transmitted to anyone within range of the wireless communication device (e.g., the wireless communication device 120). This may include emergency messages, messages broadcast from a retailer, and the like. Group Messages are intended for a specific group or organization, such as a scout group or employees of a particular company or any formed group. Direct Messages are private messages intended for a specific individual. In addition, the wireless communication device 120 may transmit Status Messages, which can include, by way of example, a list of other wireless communication devices in the particular short-range communication network 116, a list of recent wireless communication devices in the particular short-range communication network, a list of other short-range communication networks in which the wireless communication device was recently a member, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," FILED ON Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the wireless communication device with which the last synchronization was performed. This information may help maintain synchronization between wireless devices.

The message data may include, but is not limited to, text message data, audio data, video data, multimedia data, or the like. As those skilled in the art will appreciate, Public Messages may be received and processed by any wireless communication device. In contrast, Group Messages may only be processed by a member of the designated group, while a Direct Message may only be processed by the individual wireless communication device for whom the message is intended.

Synchronization may occur directly between the wireless communication devices or via the access point 140 illustrated in FIG. 4. For example, message synchronization can occur between the wireless communication device 120 and the wireless communication device 126 using the access point 140. In addition, as will be described in greater detail below, wireless communication devices can carry message data as they move from one short-range communication network to another.

In another embodiment, a retail business may broadcast Public Messages to nearby wireless communication devices. In an exemplary embodiment, the retail facility can set up a wireless access point (e.g., the wireless access point 140 in FIG. 3) to establish a short-range communication network 116. For example, a retail facility in a shopping mall can transmit advertisement messages to nearby wireless communication devices. In a typical embodiment, these would be Public Messages that are freely relayed from one wireless communication device to another and from one short-range wireless communication network 116 to another. Using this form of message distribution, an advertisement from a retail facility will soon be disseminated to all wireless users in the area. The advertisements may take the form of text messages or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the wireless communication devices in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

Figure 5:
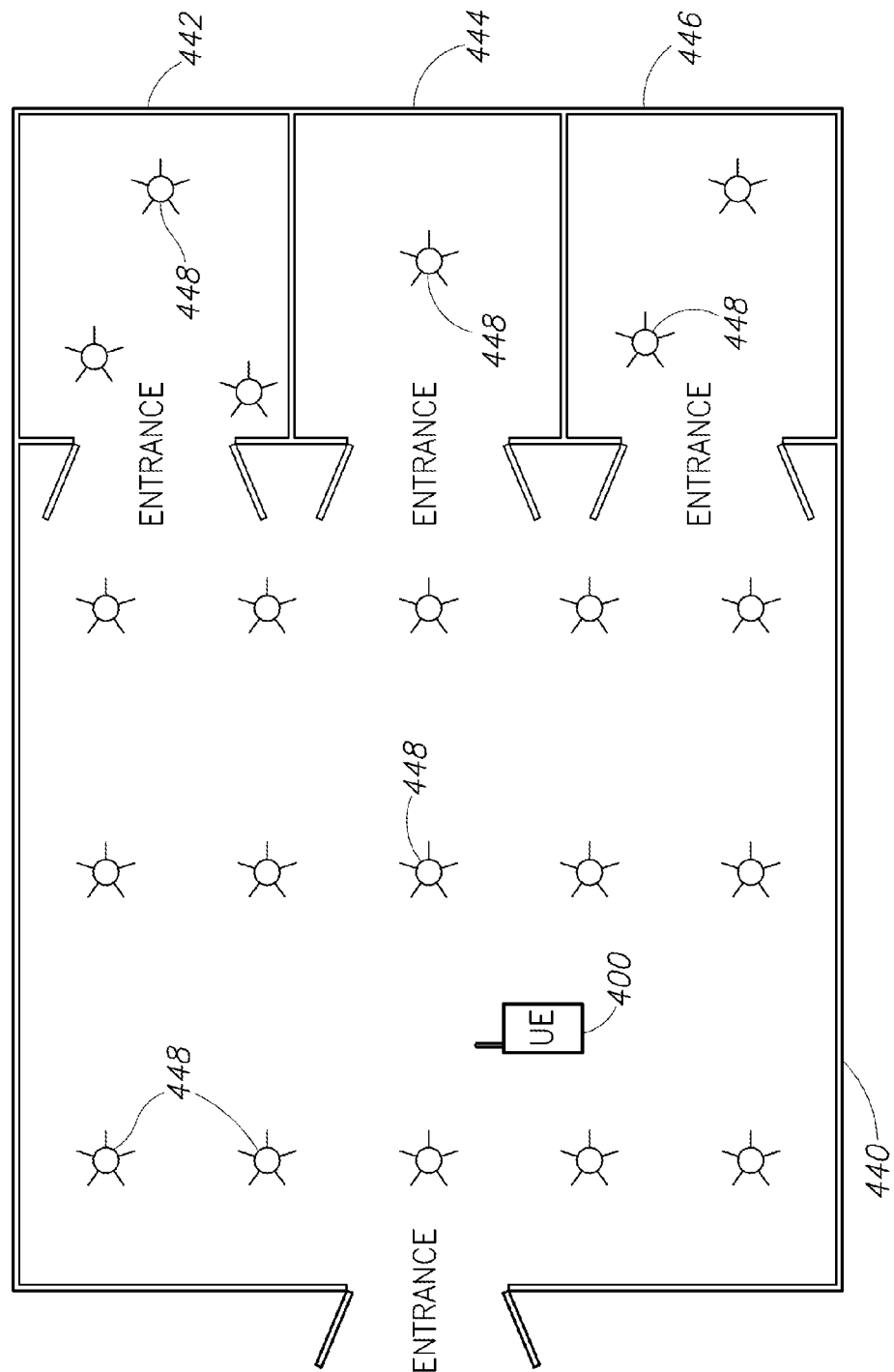
FIG. 5 illustrates a venue with a large number of distributed wireless access points.

FIGS. 3 and 4 illustrate a single access point to facilitate communication between ones of the wireless communication devices. However, in a different embodiment, a particular location may have a large number of access points to facilitate communication between the venue and a large number of individual wireless communication devices. FIG. 5 illustrates a large venue 440, such as a casino. In such a large venue, there may be related businesses 442-446 located within or near the venue 440. In the casino example, the related business 442 may be a performance venue for singers, comedy acts, and the like. The related business 444 may be a nightclub while the related business 446 may be a restaurant.

Due to the large size of the venue 440, it may be necessary to deploy a network of APs, illustrated by the reference number 448. The position and coverage area of the APs 448 can be determined based on the particular hardware implementation. The actual distribution and installation of the APs 448 within the venue 440 is within the engineering knowledge of one skilled in the art and need not be described in greater detail herein.

Figure 6:
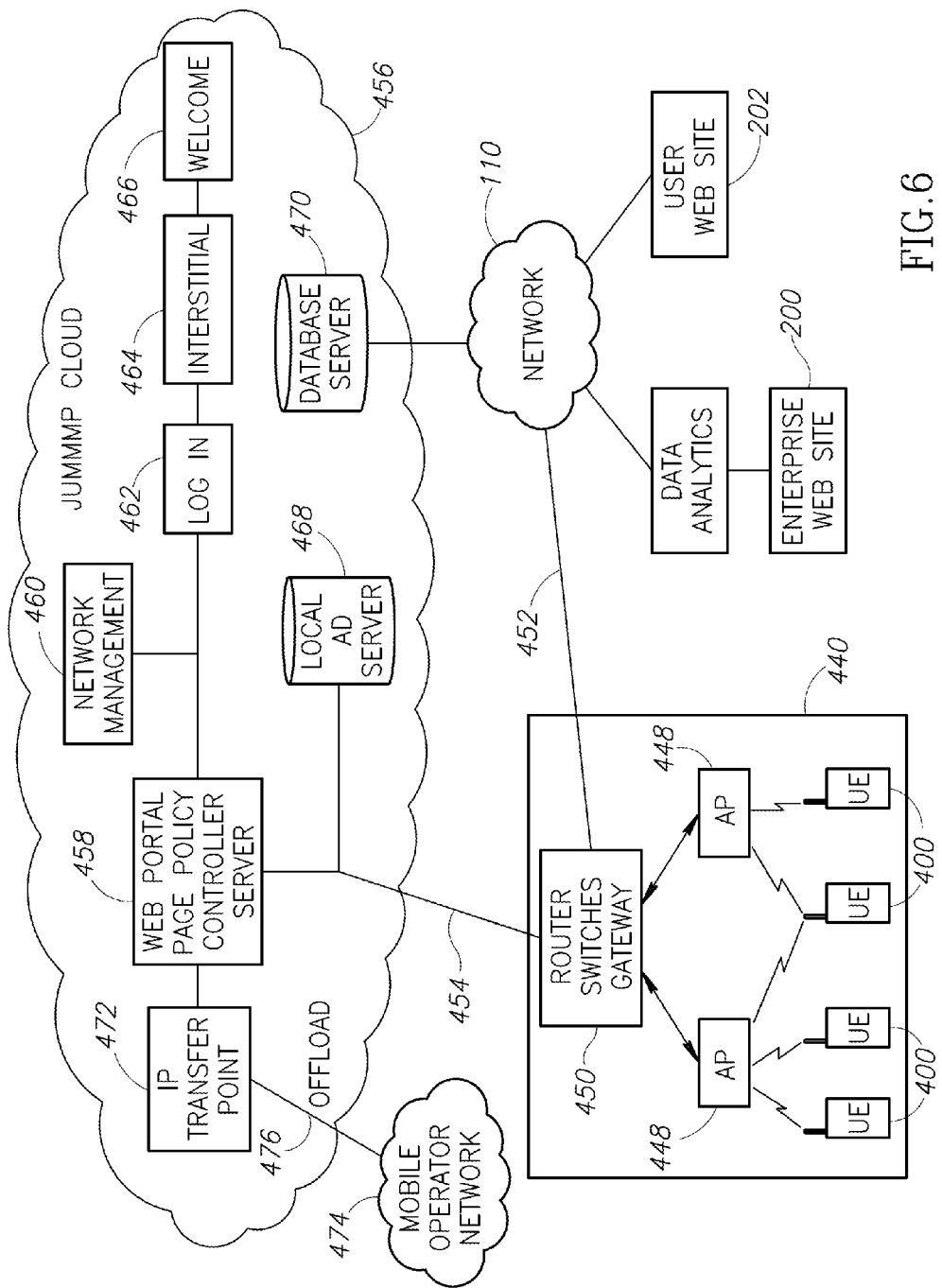
FIG. 6 illustrates a system architecture in which a venue communicates with a Cloud network.

In the embodiment of FIG. 5, all of the APs 448 may be coupled to a routing infrastructure 502 (see FIG. 8) or a gateway 450 (see FIG. 6). As the UE 400 moves throughout the venue 440, it is making and breaking connections between the UE 400 and one or more of the APs 448. The identity of the UE 400 can be verified by the UE providing a profile and user information and signing up for the WiFi service and downloading an application program interface (API) in exchange for free WiFi service. Initially this may be accomplished through a portal page, as will be described in greater detail below. The API is a software program that aids in the authentication of the UE 400 and further facilitates communication between the UE 400 and the venue 440. The API also facilitates the exchange of Private Messages, Group Messages, and Public Messages between wireless communication devices and between the wireless communication device and an AP (e.g., one of the APs 448 in FIG. 5).

Once the identity of the UE 400 has been verified, the server 432 can provide customized messages to the owner of the UE 400. While the UE 400 remains within the venue 440, it is in substantially continuous contact with the APs 448 and may receive data therefrom. For example, the UE 400 could receive an ad for free or discounted tickets to the performance venue 442 or an invitation to happy hour at the nightclub venue 444 or a discounted meal at the restaurant venue 446. If the owner of a UE 400 is not a registered guest at a hotel within the venue 440, the APs 448 could send an invitation or ad to book a room in the venue 440. The UE 400 can communicate with the server 432 via the APs 448 to accept one or more of the ad offers. For example, the UE 400 could transmit an acceptance and book tickets at the performance venue 442. Similarly, the user of the UE 400 can book a room in the venue 440.

The venue 440 can establish virtually continuous wireless communication links with the UE 400 and provide a stream of ad content (e.g., ads, offers, discounts, etc.) for the venue 440 and the related businesses 442-446. Thus, the stream of ad data to the UE 400 may be for the venue 440 and the related businesses 442-446. Alternatively, the venue 440 may provide advertising for a different venue (not shown). For example, if the venue 440 is a casino in a large city, such as Las Vegas, the server 432 may provide ad content for a related business down the street or even for a third-party business with whom the venue 440 has contracted to provide advertising to the UE 400. For example, the AP 448 may provide advertising for a convention at a different venue or for a boxing match at a different venue. Thus, advertising content may or may not be related to the venue 440 in which the UE 400 is presently located.

FIG. 6 illustrates a system architecture that allows operation of the system across multiple venues. In FIG. 5, the venue 440 is illustrated with a limited number of UEs 400 and a limited number of APs 448. As discussed above with respect to FIG. 5, the venue 440 may have a large number of APs 448 distributed throughout the venue. The various APs are coupled together using routers, switches, and the like. Those routers, switches and gateways are illustrated in FIG. 6 by the reference 450. Among other things, the gateway 450 allows an interconnection to the network 110 via a communication link 452, but could be any wide area network. In a typical embodiment, the network 110 may be implemented as the Internet. In addition to the communication link 452, the gateway 450 provides a backhaul 454 to a cloud computing environment designated as a JUMMMP Cloud 456. The backhaul 454 may be implemented in a variety of different manners using known technology. In one embodiment, the backhaul 454 may be routed to the JUMMMP Cloud 456 via the network 110.

Within the JUMMMP Cloud 456 are a number of components. A web portal page and policy controller server 458 controls user authentication across a number of different venues in addition to the venue 440. A network management element 460 controls overall operation of the network in the JUMMMP Cloud 456.

FIG. 6 illustrates a number of different web pages that may be downloaded to the UE 400 in the venue 440. In one embodiment, the venue 440 may include its own server and store its own portal pages. However, such an architecture requires that each venue have a separate server to support this functionality. The system in FIG. 6 advantageously utilizes the web portal page server and policy controller server 458 for multiple venues. The JUMMMP Cloud 456 may have some common pages for all venues, such as a log-in web page 462. However, even the log-in web page may be unique to the venue 440.

In addition to the log-in web page 462, the JUMMMP Cloud 456 may have one or more interstitial web pages 464. For example, interstitial web pages may display information about the venue 440 (or advertising for businesses within the venue, third party advertising, or advertising for other venues within the JUMMMP network) while the user is waiting for completion of the registration verification process. In addition, the JUMMMP Cloud 456 may include one or more welcome web pages 466. The welcome web pages 466 may offer various services, such as a credit card data entry page, and Internet access sign-up page, a voucher code entry page to permit the user to enter discount voucher data, and the like. For example, the initial registration can provide WiFi connectivity at a certain service level, such as a basic bandwidth. However, the welcome pages may include an offer to upgrade WiFi connectivity to a higher bandwidth for an advertised price. If the user is a guest at the venue 440, the charge can be automatically made to the user's room. In another embodiment, the user's phone may be charged for the upgraded bandwidth service. Other similar services may be provided in the welcome web pages 466.

One skilled in the art will appreciate that the interstitial web pages 464 and the welcome web pages 466 may be unique to the venue 440. Even though these web pages may be unique to the venue, the centralized web portal page server 458 within the JUMMMP Cloud 456 simplifies the overall system architecture within the venue 440 and within other venues by eliminating the need for a portal page server within each venue.

A local ad server 468 in the JUMMMP Cloud 456 may provide ads for the venue 440. As discussed above, the ads may be for the venue 440 itself or for the related businesses 442-446 (see FIG. 5). In addition, the ads may be for businesses near the venue 440 (or for other venues in the JUMMMP network). The centralized ad server 468 in the JUMMMP Cloud 456 simplifies the network architecture within the venue 440 and other venues by eliminating the need for an ad server within each venue.

A data base server 470 in the JUMMMP Cloud 456 may be configured to collect a broad range of information regarding the UEs 400 (including the user profile information from the data storage area 184 (see FIG. 2) that was provided when the UE was first identified in the venue. The profile information will help provide targeting marketing and advertising to the UE as it traverses the venue). As previously discussed, data messages may include geo-location data. The geo-location data (e.g., longitude and latitude) can be obtained in several possible ways. In one embodiment, the wireless communication device (e.g., the UE 400 in FIG. 6) may have built-in GPS. Other possible location determination technologies include WiFi, 3G, approximation triangulation, or last-known location of the user. Other known location technologies may also be implemented in the system 100. For example, the UE 400 will communicate with different ones of the access point 448 in the venue 440 shown in FIG. 5. As the UE 400 moves throughout the venue, new communication links are established with nearby access points 448. By identifying which access point 448 the UE 400 is communicating with, it is possible to determine the location of the UE 400 with a reasonable degree of accuracy. The database server 470 is configured to store location information, along with time/date data to thereby track movements of the UE 400. In one embodiment, the database server 470 can also be configured to store message data from the UEs 400 throughout the system 100. In yet another embodiment, the database server 470 may also store user profiles for the UE 400 as well as profile data collected by the UE 400 from other JUMMMP users. In one configuration, the API, which is installed on the UE 400 as part of the verification process described above, is configured to generate a "heartbeat" signal that periodically reports location data back to the database server 470. The location data may include a time/date stamp to provide location information for the UE 400. This information can be useful for marketing purposes. Using the example of FIG. 5, where the casino venue 440 includes a large area as well as related businesses 442-446, the database server 470 can determine how long the UE 400 remains in a particular area (e.g., one area of the casino), how many times and how long the UE remains at the bar, in a nightclub or the like. By collecting this information, the database server 470 can establish a user profile for the UE 400 for marketing purposes.

The JUMMMP Cloud 456 also includes an IP transfer point 472, which is coupled to a mobile operator network 474 via a communication link 476. As those skilled in the art will appreciate, mobile data offloading, also called data offloading, involves the use of complementary network technologies for delivering data originally targeted for cellular networks, such as the mobile operator network 474. In areas where the cellular network traffic is heavy, network congestion may occur. To reduce congestion, mobile network operators sometimes set up WiFi access points in areas of congestion and allow some of the data originally targeted for the mobile operator network 474 to be carried by the WiFi network. Rules triggering the mobile offloading action can be set by an end user (i.e., the mobile subscriber) or the mobile network operator. The software code operating on the offloading rules can reside in the UE 400, in a server, or divided between these two devices. For the end users, the purpose of mobile data offloading may be based on the cost for data service and the ability of higher bandwidth. For mobile network operators, the main purpose for offloading is to reduce congestion of the cellular network. The primary complementary network technologies used for mobile data offloading are WiFi, femtocells, and integrated mobile broadcast.

In a typical embodiment, each mobile network operator has its own WiFi network to offload data that would otherwise be carried on its particular mobile operator network. In the context of FIG. 6, the APs 448 within the venue 440 do not belong to the operator of the mobile operator network 474 as is normally the case in data offloading. In the implementation described in the present disclosure, the data offloading is provided by the venue 440 through contract with the mobile operator network 474. Although FIG. 6 illustrates only a single mobile operator network 474, those skilled in the art will appreciate that it is representative of one or more mobile operator networks. In operation, each mobile operator network contracts with the venue 440, either directly or with the JUMMMP Cloud 456, to provide data offloading in the venue. When the UE 400 enters the venue, the mobile network operator is notified and the mobile operator network 474 can determine whether or not to offload data traffic for that UE. If data offloading for the UE is approved in accordance with the rules described above, Internet access, text messaging, and even telephone calls can be provided to the UE 400 via a connection from the mobile operator network 474 through the communication link 476 to the IP transfer point 472 within the JUMMMP Cloud 456. In turn, that offloaded data is routed through the backhaul 454 to an AP 448 and ultimately to the UE 440. Similarly, outgoing calls from the UE 400 may be routed in the reverse fashion. This approach has the beneficial effect of offloading traffic from an otherwise congested mobile operator network 474. In addition, the mobile network operator may find improved performance because direct communication with the UE 400 through a base station (e.g., the base station 104 in FIG. 1) may not work well when the UE 400 is inside a building, such as the venue 440. Thus, improved reception and reduction in network congestion are double benefits of the IP offloading provided by the JUMMMP Cloud 456.

In the embodiment of FIG. 6, the policy server controller 458 may function as a registration server to assure the authentication of the UE 400. Those skilled in the art will appreciate that the components shown in the JUMMMP Cloud 456 are illustrated as individual elements. In one embodiment, a single policy controller server 458 may be sufficient for a large area, such as the entire country. Indeed, in one embodiments, a single policy controller server 458 may provide registration services for the entire system 100. However, those skilled in the art will appreciate that the policy controller server 458 may be illustrative of a number of different computing platforms designed to implement the functionality of the policy controller server. In one embodiment there may be a policy controller server for large cities, individual states, regions of the country, or an entire country. In another embodiment, the policy controller server 458 may be implemented in a hierarchical fashion where a local or regional policy server controller 458 contains local and regional data, but may communicate with regional or national policy controller servers 458 on a higher hierarchical level. For example, if the UE 400 performs an initial registration in one city, that registration data may be stored in a local implementation of the policy controller server 458 and reported to a regional or national level of the policy controller server. In this manner, the registration data may be efficiently distributed throughout a wide area. As will be discussed in detail below, this arrangement also facilitates easy subsequent authentication of the UE 400.

The UE 400 must perform an initial registration with the system 100 at some point in time. The initial registration can be performed remotely using, by way of example, a laptop or PC connected to the JUMMMP Cloud 456 via the network 110. In another variation, the UE can perform an initial registration as it enters the venue 440 illustrated in FIG. 6, as described above. When the UE 400 initially contacts any of the APs 448, the policy controller server 458 will not have any data related to a particular UE 400. In this case, that initial AP 448 in the venue 440 may perform an initial registration. For the initial registration, the UE 400 can connect to the initial AP 448 and provide identification information. In an exemplary embodiment, the user can complete the initial registration process by providing data, such as the telephone ID (i.e., the phone number), a device ID, a user ID, and an email address as well as other information, such as the user profile in the data storage area 184 (see FIG. 2). The user ID may be a user generated name, nickname, or the like. The device ID may vary based on the particular type of the UE 400. For example, if the UE 400 utilizes an Android™ operating system, the device will be assigned an Android™ ID. In addition, the UE 400 may typically be assigned an international mobile equipment identification (IMEI). Any of these device identifications alone may be transmitted to the registration server 458. In another alternative embodiment, a unique hash of one or more device IDs may be generated and transmitted to the registration server 458 as the device ID. The short-range transceiver 176 (see FIG. 2) may also include an identification, such as a MAC address that is unique to the UE 400. The registration data described above can be provided to the registration server 458 along with the MAC address. The registration data may be stored in association with the MAC address. Once the initial registration process has been completed, subsequent authentications are greatly simplified. Once the initial registration process is completed, the web portal page server 458 may transmit other pages, such as the log-in web page 462, one or more interstitial web pages 464, and the welcome web page 466 shown in FIG. 6.

The UE 400 can also perform the initial registration using a conventional wireless service provider network. As previously discussed the UE 400 can communicate with the wireless communication network 102 (see FIG. 1) in a conventional manner. Those skilled in the art will appreciate that the UE can access the network 110 via the wireless communication network 102. Conventional wireless service provider components, such as the gateway 108 to the network 110 are known in the art, and need not be described in greater detail herein. In one embodiment, the UE 400 can perform a registration process with the registration server 458 (see FIG. 6) via the RAN 102. In this embodiment, the UE 400 accesses a website, such as the JUMMMP network website 200 illustrated in FIG. 3. In this example, the registration server 458 may be associated with the JUMMMP network website 200 (see FIG. 3) or the JUMMMP Cloud 456 of FIG. 6.

Alternatively, the UE 400 may perform an initial registration using a conventional computer (e.g., the user computing device 112 of FIG. 1) to provide the registration data for the UE 400 to the policy controller server 458 or registration server 460. For example, the user may make a reservation to visit a hotel, such as the casino venue 440 illustrated in FIG. 5. In a confirmation email from the hotel, the user may be invited to perform a registration process with the registration server using, by way of example, a link to a registration web page. If the user has previously registered the UE 400 with the policy controller server 458, the user can simply provide a message to the policy controller server 458 that the user (and the UE 400) will soon be in Las Vegas. The policy controller server 458 can download the authentication information to the local or regional registration server associated with the geographic locale of the casino venue 440. In addition, the registration server 458 may preload the data in the Allowed List 184a and the Blocked List 184b in the UE even before the UE 400 arrives in Las Vegas.

If the UE registration occurs at the venue via an AP (e.g., the AP 448 in FIG. 6), the policy control server 458 knows the geographic locale of the UE 400. The downloaded data for the Allowed List 184a (see FIG. 2) and the Blocked List 184b are lists of authenticated and unauthenticated APs in the geographic region in which the UE 400 is presently located. In this manner, the UE 400 knows that information, such as messages, coupons, advertisements, and the like are received from valid and registered businesses. At the same time, the UE 400 will block such data if the AP sending such data is in the Blocked List 184b.

In one embodiment, a previously-registered UE 400 may come within range of any of the APs 448 in the venue 440 of FIG. 6 and establish a wireless communication link therewith. In establishing the communication link, the UE 400 transmits its MAC address and/or the phone ID or IMEI. The AP 448 transmits an authentication request message to the registration server 458 to determine whether the UE 400 is a registered device. Based on the MAC address or other device identification data, the registration server can confirm that the UE 400 has previously registered. Thus, the UE 400 is authenticated whenever it comes into range of an AP 448 of the system 100. This may occur transparently to the user. This automatic authentication process can occur even if the initial registration was in a completely different part of the country. Thus, the UE 400 may move from one venue 440 to another in the same city or region or may be in a completely different part of the country and be automatically identified and authenticated with APs that are part of the system 100 described herein. This convenient registration and authentication avoids the need for constantly searching for a WiFi connection as required by other systems. Based on this automatic authentication process, the UE 400 may be automatically connected to the WiFi network created by the APs 448 in the venue. The UE 400 may get welcome greetings from the venue and may also receive advertising, offers, discounts, and the like.

Figure 7:
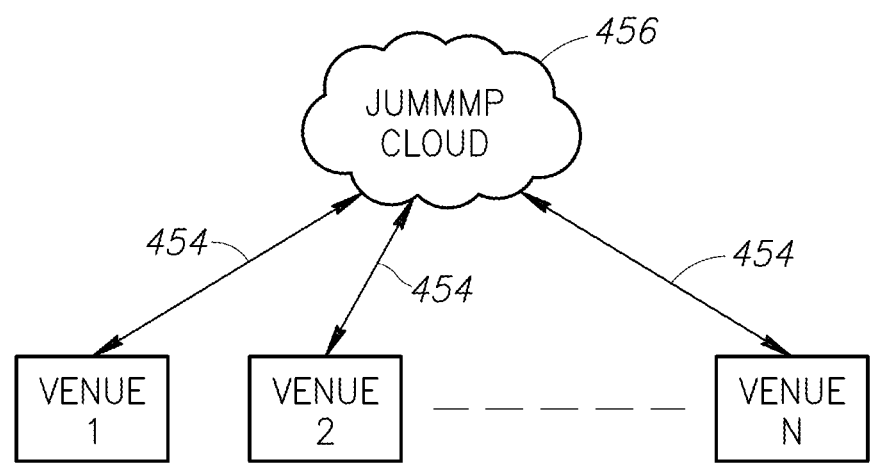
FIG. 7 illustrates the Cloud network of FIG. 6 communicating with multiple venues.

The registration process at a single venue has been discussed above with respect to FIG. 5. The JUMMMP Cloud 456 also advantageously provides a centralized registration function for multiple venues, as illustrated in FIG. 7. The multiple venues 440 are each connected to the JUMMMP Cloud 456 via individual respective backhauls 454. If a UE 400 initially registers at Venue 1, using the registration process described above, that registration information is stored in the JUMMMP Cloud 456. At a later point in time when the user enters, by way of example, Venue 2 illustrated in FIG. 7, the UE 400 will automatically identify the AP 448 and begin to communicate therewith. Because the UE 400 has already been registered, that information is passed along to the JUMMMP Cloud and the UE 400 is automatically authenticated for its new current location. This is true even if the various venues 440 are located far from one another. For example, an initial registration of the UE may take place at a sports venue in, by way of example, New York City. However, if the UE 400 is carried to a casino in, by way of example, Las Vegas, Nev., the UE 400 will automatically begin to communicate with the AP 448 in the new venue in Las Vegas. Because each venue is coupled to the JUMMMP Cloud 456, the UE 400 need not undergo another registration process when it enters the venue 440 in Las Vegas. Thus, a single registration process at any venue is sufficient for registration with the JUMMMP Cloud 456. Whenever the UE 400 goes into a different venue 440 that is coupled to the JUMMMP Cloud 456, the UE 400 is automatically recognized and authenticated. During the automatic authentication process, the JUMMMP Cloud 456 may provide interstitial portal pages 464 to the UE 400. Upon completion of the automatic registration process, welcome portal pages 466 may then be transmitted to the UE 400.

In another aspect, the wireless communication system described herein is configured to permit gaming (i.e., gambling) using the short-range communication networks 116. In many jurisdictions, gambling with real money is limited to licensed establishments. The process of exchanging game play data described herein can be implemented directly between wireless communication devices for fun, which is not limited to licensed gaming establishments. However, the process described herein is also applicable to licensed gaming establishments, such as the venue 440 in FIG. 5. With respect to FIG. 5, the UE 400 communicates directly with one or more of the APs 448 using the techniques described above. Because the communication networks 116 are short-range communication networks, communication between the UE 400 and the APs 448 is limited to the confines of the venue 440 and thus can be configured to meet the legal requirements of gambling only on the premises of the licensed establishment.

Figure 8:
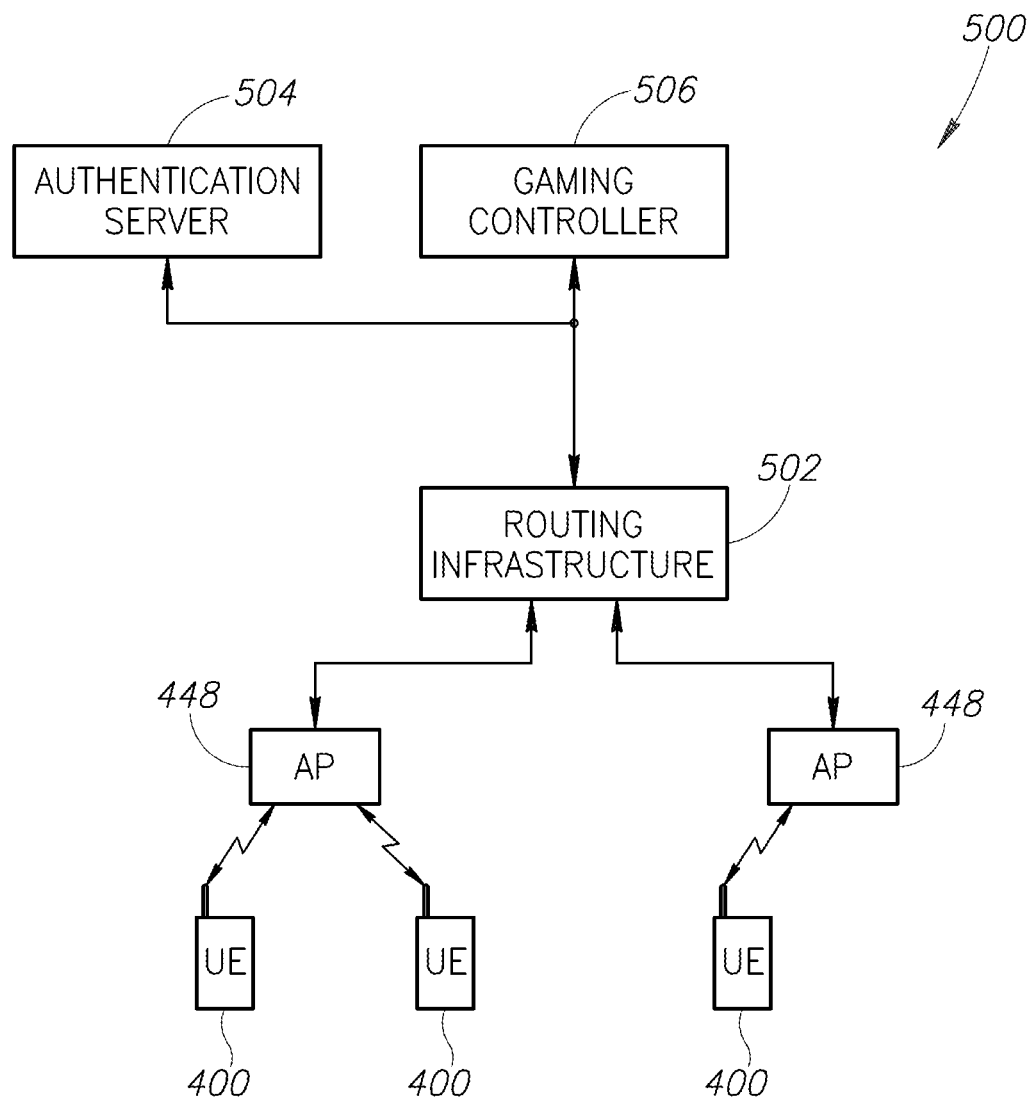
FIG. 8 is a functional block diagram of a system to implement gambling using wireless communication devices.

FIG. 8 illustrates a functional block diagram of a system 500 that can be implemented within the venue 440 (see FIG. 5) to permit gambling using the UE 400. In the example of FIG. 8, the UEs 400 are connected to ones of the APs 448. Those skilled in the art will appreciate that the UE 400 will communicate with one or more of the APs 448 based on signal characteristics, such as signal strength, data error rates, and the like. As will be described in greater detail below, the UEs 400 participating in a particular game do not have to be connected to the same AP 448.

The plurality of APs 448 are coupled to a routing infrastructure 502. Like the router, switches, gateway 450 in FIG. 6, the routing infrastructure 502 comprises routers, switches, gateways, firewalls, and the like. The implementation of the routing infrastructure 502 in connecting a plurality of the APs 448 is within the scope of knowledge of ordinary skill in the art and need not be described in greater detail herein.

The routing infrastructure 502 couples the APs 448 to an authentication server 504 and a gaming controller 506. As can be appreciated, it is important to authenticate each UE 400 that will participate in gambling activities. The authentication process has already been discussed in detail above with respect to FIGS. 6-7. In one embodiment, the initial registration and authentication can occur when the UE 400 first enters the venue 440. This process is described above. Furthermore, if the UE 400 was previously registered, even at a different venue, such as the Venue 2 in FIG. 7, the UE 400 can be automatically authenticated when the user enters the venue 440 if the authentication process occurs in the JUMMMP Cloud 456. Thus, the authentication server 504 may be a local server within the venue 440 or may be part of the JUMMMP Cloud 456. As discussed above, the web portal page policy controller server 458 can function as the authentication server in the JUMMMP Cloud 456. The web portal page server 458 controls the display of log-in web pages 462, interstitial web pages 464, and welcome web pages 466, as described above. Part of those series of web pages may include an option for the UE 400 to register for gaming activities. The user may apply for gambling credits using a credit card account as described above with respect to the initial authentication process. The user may select a desired amount of gambling credits to be credited to a player account so that each round of betting does not require the further exchange of credit card information. As discussed above with respect to credit card registration, all financial information is encrypted prior to transmission from the UE 400 to the JUMMMP Cloud 456.

Once the user has gambling credits in a player account, the user may select from a number of different possible games. The games may generally fall into two categories. In the first category, each individual player is playing against the house (i.e., the gaming establishment). For example, Keno, roulette, blackjack, and the like are played between the user and the house even though each game may have a large number of participants. The second category of games are ones in which the player competes against other players. For example, various poker games are played between the individual players with the house acting as the dealer. As will be described in detail below, both categories of games may be readily implemented with the present system.

The system 500 also includes the gaming controller 506 to control actual operation of the gaming events. In an exemplary embodiment, the gaming controller may be implemented as a conventional computer server configured to communicate with multiple ones of the UEs 400 and further configured to play multiple different games. The gaming controller 506 includes conventional computer components, such as a processor, memory, data storage (e.g., a disk and/or optical data storage), network communication interfaces, and the like. In a typical embodiment, the gaming controller 506 may also include conventional computer components, such as display, keyboard, cursor controller, and the like. The operation of these conventional computer elements is well known in the art and need not be described in greater detail herein except as to the nature of the game play data communication between the gaming controller and the various UEs 400.

Although FIG. 8 illustrates only a single gaming controller 506, those skilled in the art will appreciate that the venue 400 may include one or more gaming controllers 506 based on the volume of gambling that occurs within the venue 440. More popular gambling games may require more gaming controllers 506 while other gaming controllers 506 may be used to control a number of smaller games or games that do not require as great a degree of real-time or near real-time communication. For example, Keno only requires occasional game play data to be transmitted from the UE 400 to the gaming controller 506 and game play data messages from the gaming controller 506 to the individual UEs as the numbers are drawn for each Keno race.

In one embodiment, the game play using the system 500 may be virtual game play entirely controlled by the gaming controller 506. For example, roulette could be played with the gaming controller 506 generating simulated spinning of the roulette wheel and the virtual ball dropping into a randomly selected slot on the wheel. In an alternative embodiment, the system 500 may permit the UEs 400 to participate in actual casino game play. Using the example of roulette, the UE 400 may place a bet in the normal manner, but may view an actual video of a roulette wheel in the casino as the wheel spins and the ball drops into one of the slots. In this embodiment, the player participates in an actual game and may see real time video of the game play or an electronic simulation of actual game play where a virtual roulette wheel may spin in synchrony with the actual wheel at a particular location within the casino and a virtual ball drops into a virtual slot as the real ball drops into the same slot on the actual roulette table.

Each of the games are played in accordance with the game play rules for that game. The game play rules for various games are well known and need not be described in greater detail herein. For example, Keno games are conducted periodically. A player bets a user-selected amount and picks between 4 and 10 numbers ranging between 1 and 80. Every few minutes, a round of Keno, called a Keno race, is run and 20 numbered balls are drawn at random from a container holding the 80 numbered balls. The winnings for any individual Keno race are based on the number of numbers drawn that match the user-selected numbers.

Keno may be implemented using the wireless communication system by downloading a software version of Keno to the UE 400. This permits a player to select 4 to 10 numbers ranging between 1 and 80. The user may also select a dollar value for the bet. As the Keno race is conducted, the selected numbers may light up on the display 154 (see FIG. 2) of the UE 400 and selected numbers that match the user-selected numbers may be highlighted in a different color. As each Keno race is concluded, a message may be sent to each UE 400 indicating whether or not there were any winnings. The winning dollar value, or loss, can be credited or debited to the appropriate player account. The downloaded game is properly encrypted so as to assure the legitimacy of game play. The user account will be verified before the game, and after each game, through connection to the gaming controller 560.

Roulette may be played in a similar fashion in accordance with roulette game play rules. In this implementation, a roulette software program may be downloaded to the UE 400 to allow the user to place bets in accordance with roulette game play rules. The roulette game play software may include a graphic simulation of the spinning roulette wheel that shows the ball dropping into a particular slot. Upon completion of a round, the UE 400 can receive a message indicating the amount won or lost. Again, the player account may be credited or debited to reflect the wins and losses.

The exchange of game play data for the first category of games (i.e., games played against the house) may be transmitted back and forth via Private Messages, as described above. Private Messages are designated for a single recipient and may also be encrypted for extra security.

In player vs. player games, such as poker, there may be a greater need for security in the exchange of game play data to prevent the inadvertent interception of game play data from one player by another competing player. For example, satisfactory operation of a poker game using the system 500 requires security for the game play data involving cards that are dealt face down to each player. This prevents the players from knowing what cards have been dealt to their opponents. The game play data requiring greater security may be transmitted in the form of Private Messages and, further, may be encrypted to prevent unauthorized interception. As described above, Private Messages are intended for a single recipient and can only be processed by the intended recipient. Other forms of game play data in a player versus player category may be transmitted as Group Messages. Using the example of a poker game, the betting that may occur after each round of cards are dealt must be known between the players as well as the house. In one embodiment, when a player makes a bet, the UE 400 for that player transmits the game play data to the gaming controller 506. In turn, the gaming controller 506 transmits the betting game play data to others of the game play participants in the form of a Group Message. In this manner, each of the players receives the betting data from the gaming controller 506. In this embodiment, all communications between the UEs 400 occur via the APs 448 and the gaming controller 506. This is true even if the UEs 400 are in close proximity with each other and may even be communicating with the same AP 448. This permits a greater degree of control of the game by the licensed establishment (i.e., the house).

In a different form of communication, certain game play data may be made known to all players participating in the game. Using the poker example, it has already been described how cards dealt face down may be communicated to each individual player using Private Messages and/or encryption to prevent the unauthorized interception of that game play data. However, other cards in the poker game may be dealt face up so as to be visible to all game play participants. In this example, the game play data may be transmitted in the form of a Group Message designating each of the individual players in the game. Even with a Group Message, encryption may also be desirable for added security. Thus, the game play data may be transmitted back and forth between the UEs 400 and the gaming controller 506 using a combination of Public Messages, Private Messages, and Group Messages.

Figure 9:
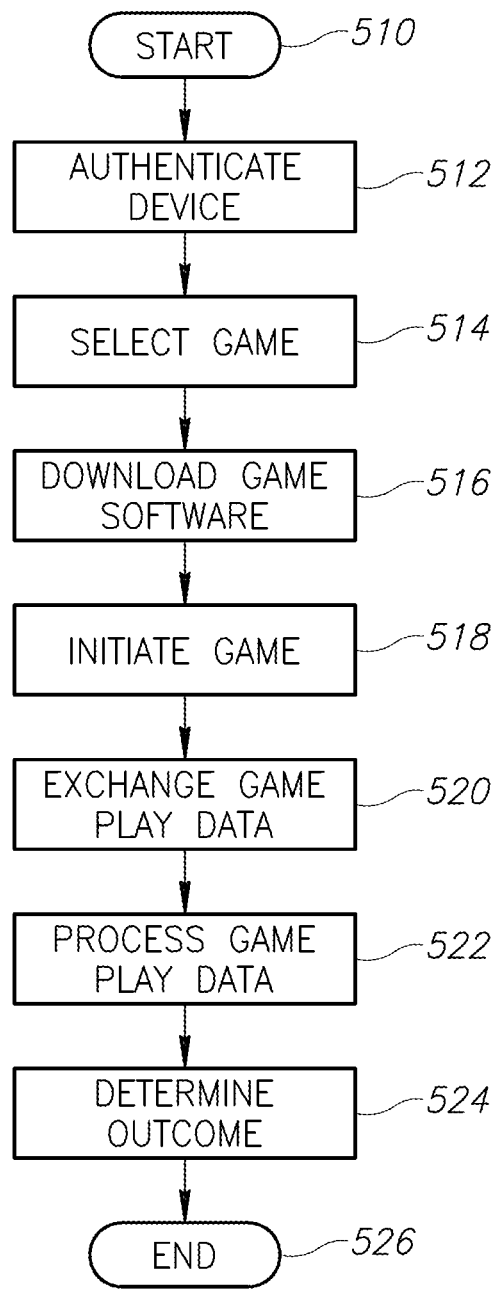
FIG. 9 is a flow chart illustrating the operation of the system of FIG. 8.

FIG. 9 is a flow chart illustrating the operation of the system 500 for wireless game play activities. At a start 510, the UE 400 may have just entered the venue or may have just been powered up by the user. In step 512, the system 500 authenticates the device. The process for the initial registration and authentication or automatic authentication of a previously registered UE 400 has been described above. In game play activity, it may be desirable to authenticate the UE 400 for each game (e.g., poker, roulette, etc.). Alternatively, the system 500 may wish to re-authenticate the device periodically (e.g., once per hour or once per day).

Following the authentication process, the user may select a game in step 514. In one embodiment, the venue 440 (see FIG. 5) may provide a web page that lists the available games as part of the welcome web pages 466 (see FIG. 6). These may be provided to the UE 400 as a link to a web page, or maybe a short program downloaded to the UE 400 to provide icons for each of the available games. With any of these implementations, the user selects the desired game in step 514 and, in step 516, the system 500 downloads game play software for the selected game using one of the APs 448. The downloaded games can have software certificates to verify that the downloaded application is valid and secure.

In step 518, game play is initiated in accordance with the game play rules for the particular game. In step 520, the UEs 400 and the gaming controller 506 may exchange game play data. Those skilled in the art will appreciate that the type of game play data exchanged in step 520 is dependent on the particular game selected by the user. In games, such as Keno, roulette, and the like, the game play data may be initially transmitted from the UE 400 to the gaming controller 506 to select a dollar value for the bet and to select the numbers on which the player is betting. In turn, the game play data generated by the gaming controller 506 may be results data, such as the selected Keno numbers in a particular Keno race, or the winning number in a roulette game, or the like.

In step 522, the system 500 processes the game play data. In the example of Keno or roulette, the game play activity occurs in a single "round" where the outcome is determined after the simple exchange of game play data described above. In different games, such as poker, there may be multiple rounds of cards being dealt by the gaming controller 506 and multiple rounds of betting by the individual players in the game. Thus, steps 520 and 522 may be repeated depending on the nature of the game.

In step 524, the gaming controller 506 determines the outcome of the game and transmits game play data indicating the outcome to each of the UEs 400. In addition, the gaming controller 506 sends messages to credit or debit the individual players' accounts based on the determined outcome. The process ends at 526.

A system of game play using the ATs 448 distributed throughout a venue has been described in detail above. There is also the option of the UE 400 downloading a software game and playing in a peer-to-peer fashion with other UEs 400 that may be in communication via the short-range communication network 116. In this embodiment, communications may be directly exchanged between the UEs 400 in a non-WiFi AP based network as opposed to game control through the gaming controller 506 and APs 448. In this scenario, the UE 400 checks in through the AP 448 before and after each game has been played to verify the credits and game wagers.

In this aspect, the gaming controller 506 is not actually involved with the playing of the game itself. Instead, software is downloaded to each of the UEs 400 involved in the game play and the game is played device-to-device in the ad hoc network described above with respect to the short-range communication networks 116. The direct peer-to-peer gaming application may relieve some traffic flow from the APs 448 and may result in a reduction of the number of gaming controllers 506 needed to support the venue gambling described above. The reason for this is that in a peer-to-peer environment, the game is managed locally through secure UDP broadcasts between the UEs 400. In the application requiring operation of the gaming controller 506 through the network of APs 448, each connection to the gaming controller 506 is encrypted and secured thus requiring additional server overhead. In contrast, a peer-to-peer communication network may allow gambling through direct communication between the UEs with only the results being reported to the gaming controller. Those skilled in the art will appreciate that this reduces the number of secure and encrypted messages that must be exchanged between the UEs 400 and the gaming controller 506 thus reducing the server overhead and possibly reducing the number of servers required for a full implementation.

As noted above, some gaming laws require that the gambling be conducted within the premises of a licensed facility. In this aspect, it should be noted that the gaming controller 506 can be local to the venue (e.g., the venue 440 in FIG. 5) and the APs 448 are also local within the venue and thus the UEs 400 will be verified locally within the confines of the venue. This prevents possible GPS spoofing of the AP 448 to give a false location.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for gaming using a wireless communication device comprising:
    receiving an authentication request from a wireless communication device at a wireless access point controlled by a gaming establishment;
    in response to the authentication request, verifying an identity of the wireless communication device;
    if the identity is verified, establishing a gaming communication link between the authenticated wireless communication device and a venue gaming controller to exchange game play data between the authenticated wireless communication device and the venue gaming controller and thereby permit the authenticated wireless communication device to play a game; and
    providing payment information to the venue gaming controller to generate player credits wherein the game is played using player credits.

2. The method of claim 1 wherein the venue includes a plurality of wireless access points and the gaming communication link is established between the authenticated wireless communication device and the venue gaming controller using one or more of the plurality of wireless access points.

3. The method of claim 1 wherein the gaming communication link is established between the authenticated wireless communication device and the venue gaming controller using a wireless access point within the venue to thereby assure that the game play occurs within the gaming establishment.

4. The method of claim 1 wherein providing payment information to the venue gaming controller further comprises encrypting the payment information and transmitting the encrypted payment information to the venue gaming controller via a wireless access point.

5. A method for gaming using a wireless communication device comprising:
    receiving an authentication request from a wireless communication device at a wireless access point controlled by a gaming establishment;
    in response to the authentication request, verifying an identity of the wireless communication device; and
    if the identity is verified, establishing a gaming communication link between the authenticated wireless communication device and a venue gaming controller to exchange game play data between the authenticated wireless communication device and the venue gaming controller and thereby permit the authenticated wireless communication device to play a game wherein a plurality of additional wireless communication devices have been authenticated and the gaming communication link is established between the authenticated wireless communication device and the venue gaming controller using one or more of the plurality of additional authenticated wireless communication devices.

6. A method for gaming using a wireless communication device comprising:
    receiving an authentication request from a wireless communication device at a wireless access point controlled by a gaming establishment;
    in response to the authentication request, verifying an identity of the wireless communication device; and
    if the identity is verified, establishing a gaming communication link between the authenticated wireless communication device and a venue gaming controller to exchange game play data between the authenticated wireless communication device and the venue gaming controller and thereby permit the authenticated wireless communication device to play a game wherein the game is played between a player operating the authenticated wireless communication device and the establishment operating the venue gaming controller and the game play data is exchanged between the player and the establishment using one or more private messages.

7. A method for gaming using a wireless communication device comprising:
    receiving an authentication request from a wireless communication device at a wireless access point controlled by a gaming establishment;
    in response to the authentication request, verifying an identity of the wireless communication device; and
    if the identity is verified, establishing a gaming communication link between the authenticated wireless communication device and a venue gaming controller to exchange game play data between the authenticated wireless communication device and the venue gaming controller and thereby permit the authenticated wireless communication device to play a game wherein the game is played between a player operating the authenticated wireless communication device and the establishment operating the venue gaming controller and the game play data is exchanged between the player and the establishment is encrypted.

8. A method for gaming using a wireless communication device comprising:
    receiving an authentication request from a wireless communication device at a wireless access point controlled by a game establishment;
    in response to the authentication request, verifying an identity of the wireless communication device; and
    if the identity is verified, establishing a gaming communication link between the authenticated wireless communication device and a venue gaming controller to exchange game play data between the authenticated wireless communication device and the venue gaming controller and thereby permit the authenticated wireless communication device to play a game wherein the game is keno, and the game play data transmitted by the authenticated wireless communication device comprises number selection data and betting data, the game play data transmitted by the venue gaming controller comprises number results data and win/loss data.

9. A method for gaming using a wireless communication device comprising:
receiving an authentication request from a wireless communication device at a wireless access point controlled by a gaming establishment;
in response to the authentication request, verifying an identity of the wireless communication device; and
if the identity is verified, establishing a gaming communication link between the authenticated wireless communication device and a venue gaming controller to exchange game play data between the authenticated wireless communication device and the venue gaming controller and thereby permit the authenticated wireless communication device to play a game wherein the game is roulette, and the game play data transmitted by the authenticated wireless communication device comprises number selection data and betting data, the game play data transmitted by the venue gaming controller comprises number results data and win/loss data.

10. A method for gaming using a wireless communication device comprising:
receiving an authentication request from a wireless communication device at a wireless access point controlled by a gaming establishment;
in response to the authenticated request, verifying an identity of the wireless communication device; and
if the identity is verified, establishing a gaming communication link between the authenticated wireless communication device and a venue gaming controller to exchange game play data between the authenticated wireless communication device and the venue gaming controller and thereby permit the authenticated wireless communication device to play a game wherein the game is a card game, and the game play data transmitted by the authenticated wireless communication device comprises betting data, the game play data transmitted by the venue gaming controller comprises betting data and results data.

11. A method for gaming using a wireless communication device comprising:
receiving an authentication request from a wireless communication device at a wireless access point controlled by a gaming establishment;
in response to the authenticated request, verifying an identity of the wireless communication device; and
if the identity is verified, establishing a gaming communication link between the authenticated wireless communication device and a venue gaming controller to exchange game play data between the authenticated wireless communication device and the venue gaming controller and thereby permit the authenticated wireless communication device to play a game wherein a plurality of additional wireless communication devices have been authenticated and the game is played between the player operating the authenticated wireless communication device and a plurality of players operating respective ones of the plurality of additional authenticated wireless communication devices, the method further comprising:
exchanging game play data between the game participating authenticated wireless communication devices to permit the players to play the game against each other wherein game play data is exchanged between the participating authenticated wireless communication devices via the venue gaming controller so that no game play data is exchanged directly between any of the participating authenticated wireless communication devices.

12. The method of claim 11 wherein the game play data is exchanged between the participating authenticated wireless communication devices using one or more private messages.

13. The method of claim 12 wherein the game play data comprises playing card data transmitted by the venue gaming controller and the one or more private messages comprise card play data transmitted by the venue gaming controller in a private message to each of the participating authenticated wireless communication devices such that the card play data transmitted to one of the participating authenticated wireless communication devices is not received by any of the others of the participating authenticated wireless communication devices.

14. The method of claim 11 wherein at least a portion of the game play data is exchanged between the participating authenticated wireless communication devices using one or more group messages that designate each of the authenticated wireless communication devices as a message recipient.

15. The method of claim 14 wherein the game play data comprises playing card data transmitted by the venue gaming controller and the one or more group messages comprise card play data transmitted by the venue gaming controller in a group message to each of the participating authenticated wireless communication devices such that the card play data transmitted to the participating authenticated wireless communication devices is received by each of the participating authenticated wireless communication devices.

16. The method of claim 14 wherein the game play data comprises betting data transmitted by one of the participating authenticated wireless communication devices to the venue gaming controller and the one or more group messages comprise betting data transmitted by the venue gaming controller in a group message to each of the participating authenticated wireless communication devices such that the betting data transmitted to the participating authenticated wireless communication devices is received by each of the participating authenticated wireless communication devices.

17. A system for gambling using a wireless communication device, comprising:
a plurality of wireless access points distributed within a venue, one or more of the plurality of wireless access points functioning as an initial wireless network access point configured to receive an authentication request from the wireless communication device;
a registration server configured to receive the authentication request and, in response to the authentication request, to verify an identity of the wireless communication device, and, if the identity is verified, to authenticate the wireless communication device; and
a venue gaming controller configured to control the flow of game play data to and from the authenticated wireless communication device via a gaming communication link between the authenticated wireless communication device and a venue gaming controller wherein the venue gaming controller is configured to receive payment information to thereby generate player credits wherein a game is played using player credits.

18. The system of claim 17 wherein the communication range of the wireless access point is limited such that the gaming communication link is established between the authenticated wireless communication device and the venue gaming controller using the wireless access point is contained within the venue to thereby assure that the game play occurs within the gaming establishment.

19. A system for gambling using a wireless communication device, comprising:
   a plurality of wireless access points distributed within a venue, one or more of the plurality of wireless access points functioning as an initial wireless network access point configured to receive an authentication request from the wireless communication device;
   a registration server configured to receive the authentication request and, in response to the authentication request, to verify an identity of the wireless communication device, and, if the identity is verified, to authenticate the wireless communication device; and
   a venue gaming controller configured to control the flow of game play data to and from the authenticated wireless communication device via a gaming communication link between the authenticated wireless communication device and a venue gaming controller wherein a plurality of additional wireless communication devices have been authenticated and the gaming communication link between the authenticated wireless communication device and the venue gaming controller is established using one or more of the plurality of additional authenticated wireless communication devices.

20. A system for gambling using a wireless communication device, comprising:
   a plurality of wireless access points distributed within a venue, one or more of the plurality of wireless access points functioning as an initial wireless network access point configured to receive an authentication request from the wireless communication device;
   a registration server configured to receive the authentication request and, in response to the authentication request, to verify an identity of the wireless communication device, and, if the identity is verified, to authenticate the wireless communication device; and
   a venue gaming controller configured to control the flow of game play data to and from the authenticated wireless communication device via a gaming communication link between the authenticated wireless communication device and a venue gaming controller wherein the game is played between a player operating the authenticated wireless communication device and the establishment operating the venue gaming controller wherein the game play data is exchanged between the authenticated wireless communication device and the venue gaming controller using one or more private messages.

21. A system for gambling using a wireless communication device, comprising:
   a plurality of wireless access points distributed within a venue, one or more of the plurality of wireless access points functioning as an initial wireless network access point configured to receive an authentication request from the wireless communication device;
   a registration server configured to receive the authentication request and, in response to the authentication request, to verify an identity of the wireless communication device, and, if the identity is verified, to authenticate the wireless communication device; and
   a venue gaming controller configured to control the flow of game play data to and from the authenticated wireless communication device via a gaming communication link between the authenticated wireless communication device and a venue gaming controller wherein a plurality of additional wireless communication devices have been authenticated and the game is played between the player operating the authenticated wireless communication device and a plurality of players operating respective ones of the plurality of additional authenticated wireless communication devices wherein each of the plurality of additional authenticated wireless communication devices is configured to establish a gaming communication link between the venue gaming controller and each of the plurality of additional authenticated wireless communication devices wherein game play data is exchanged between the participating authenticated wireless communication devices via the venue gaming controller so that no game play data is exchanged directly between any of the participating authenticated wireless communication devices.

* * * * *